United States Patent [19]

Sorensen et al.

[11] Patent Number: 5,716,579
[45] Date of Patent: Feb. 10, 1998

[54] REMOVAL OF INJECTION-MOLDED TIE FROM MOLD BY UTILIZING STAGGERED PARTING LINE

[75] Inventors: Soren Christian Sorensen; Jens Ole Sorensen, both of Cayman Kai, Cayman Islands

[73] Assignee: GB Electrical, Inc., Milwaukee, Wis.

[21] Appl. No.: 584,687

[22] Filed: Jan. 8, 1996

[51] Int. Cl.⁶ .................. B29C 45/44; B65D 63/00
[52] U.S. Cl. .............. 264/318; 264/334; 425/438; 425/DIG. 58; 249/63; 24/16 PB
[58] Field of Search ............ 264/318, 334, 264/336, 328.1; 425/556, 577, 438, DIG. 58; 249/63, 64, 66, 98, 101; 24/16 PB, 17 AP, 30.5 P

[56] References Cited

U.S. PATENT DOCUMENTS

| | | | |
|---|---|---|---|
| 2,744,288 | 5/1956 | Fienberg et al. | 425/438 |
| 2,875,472 | 3/1959 | Marcus | 425/DIG. 58 |
| 3,660,869 | 5/1972 | Caveney et al. | 24/16 PB |
| 3,924,299 | 12/1975 | McCormick | 24/16 PB |
| 3,940,103 | 2/1976 | Hilaire | 425/438 |
| 4,125,246 | 11/1978 | Von Holdt | 425/438 |
| 4,473,524 | 9/1984 | Paradis | 264/291 |
| 4,933,133 | 6/1990 | Brown et al. | 264/334 |
| 5,146,654 | 9/1992 | Caveney et al. | 24/16 PB |
| 5,389,330 | 2/1995 | Sorensen et al. | 264/328.1 |

*Primary Examiner*—Jill L. Heitbrink
*Attorney, Agent, or Firm*—Edward W. Callan

[57] ABSTRACT

In a method of injection molding a tie that includes an abutment wall surface having at least one tooth inside a locking head facing a pawl, a first mold part defines a portion of the abutment surface that includes the at least one abutment surface tooth and a second mold part defines at least a portion of a surface of the abutment wall that is on the opposite side of the abutment wall from the portion of the abutment surface that includes the at least one abutment surface tooth. The first mold part is separated from the second mold part while retaining the abutment wall in the first mold part to separate the second mold part from the opposite side of the abutment wall to thereby enable the abutment wall to flex in a direction away from the pawl into a space vacated by separation of the second mold part from the opposite side of the abutment wall so that the tie can be removed from the mold without significantly damaging the at least one abutment surface tooth.

2 Claims, 1 Drawing Sheet

000
REMOVAL OF INJECTION-MOLDED TIE FROM MOLD BY UTILIZING STAGGERED PARTING LINE

BACKGROUND OF THE INVENTION

The present invention generally pertains to injection molding of a tie that is useful for forming a loop for retaining a bundle of elongated articles, such as cables. Such a tie is commonly known as a cable tie. The present invention is particularly directed to removal from the mold of a tie having at least one tooth on an abutment surface in the locking head of the tie.

One type of tie includes an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of the opening and an abutment surface that is across the opening from the pawl, wherein the pawl has at least one pawl tooth disposed for engaging the first set of ratchet teeth when the tip of the tongue has been inserted through the opening with the first set of ratchet teeth facing the pawl, wherein the pawl, when the at least one pawl tooth is so engaged, is movable toward the abutment surface in response to pressure applied to the tongue in a direction opposite to the direction of insertion in order to force the second set of ratchet teeth against the abutment surface; and wherein at least one tooth is disposed on the abutment surface across from the pawl for engaging the second set of ratchet teeth when the tip of the tongue has been inserted through the opening with the second set of ratchet teeth facing the abutment surface and the side of the tongue including the second set of ratchet teeth is forced against the abutment surface by movement of the pawl. Such a tie is described in U.S. Pat. No. 4,473,524 to Paradis.

A prior art method of injection molding such a tie includes the steps of:

(a) providing a mold that includes mold parts for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold.

When such a tie is formed by injection molding, it is difficult to remove the tie from the mold without significantly damaging the at least one tooth on the abutment surface unless the apex of the tooth is defined at a parting line between mold parts because the portion of the mold part that defines the abutment surface has a lateral dimension that is broader than the space between such tooth and the pawl, whereby withdrawal of such mold part from a parting line between mold parts compresses and thereby distorts such tooth.

SUMMARY OF THE INVENTION

The present invention provides a method of injection molding a tie, wherein the tie is removed from the mold without significantly damaging the at least one tooth on the abutment surface.

The present invention provides a method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining an opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the pawl, when the at least one pawl tooth is so engaged, is movable toward an abutment surface of the abutment wall in response to pressure applied to the tongue in a direction opposite to the direction of said insertion in order to force the second set of ratchet teeth against the abutment surface across from the pawl; and wherein the abutment surface includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl; the method comprising the steps of (a) providing a mold that includes first and second mold parts joined at a parting line for defining a cavity between the mold parts in the general shape of the tie;

(b) injecting molten plastic material into the mold cavity;

(c) solidifying the plastic material in the mold cavity to form the tie;

(d) separating the mold parts to enable removal of the tie from the mold; and (e) removing the tie from the mold;

wherein step (a) comprises providing a said mold in which the parting line is staggered so that a first segment of the parting line at one elevation is adjacent one end of the portion of the mold cavity that shapes the portion of the abutment surface that includes the at least one abutment surface tooth and a second segment of the parting line at a different elevation is adjacent the opposite end of the portion of the mold cavity that shapes the portion of the abutment surface that includes the at least one abutment surface tooth, so that the first mold part defines the portion of the abutment surface that includes the at least one abutment surface tooth and so that the second mold part defines at least a portion of a surface of the abutment wall that is on the opposite side of the abutment wall from the portion of the abutment surface that includes the at least one abutment surface tooth; and wherein step (d) comprises the step of (f) separating the first mold part from the second mold part while retaining the abutment wall in the first mold part to separate the second mold part from the opposite side of the abutment wall to thereby enable the abutment wall to flex in a direction away from the pawl into space vacated by separation of the second mold part from the opposite side of the abutment wall so that the tie can be removed from the mold pursuant to step (e) without significantly damaging the at least one abutment surface tooth.

Additional features of the present invention are described with reference to the detailed description of the preferred embodiments.

DETAILED DESCRIPTION

Figure 1:
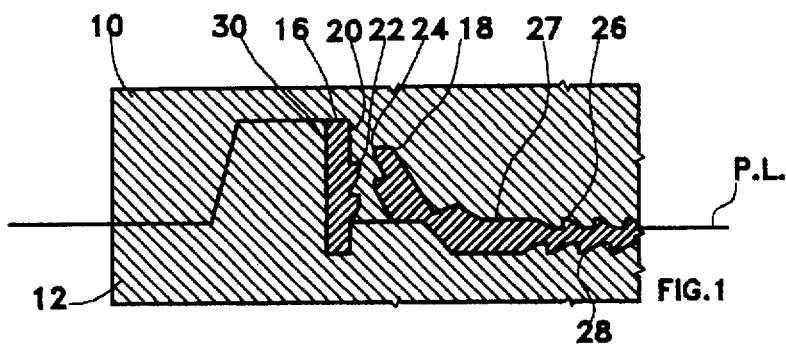
FIG. 1 is sectional view illustrating formation of the abutment surface portion of a tie in a mold utilized in a preferred embodiment of the injection molding method of the present invention.

Referring to FIG. 1, in a preferred embodiment of the method of the present invention, a tie of the type described above is injection molded in a mold including a first mold part 10 and a second mold part 12. When the mold is closed, the first mold part 10 joins the second mold part 12 at a parting line P.L.; and the first mold part 10 and the second mold part 12 define a cavity therebetween in the general shape of the tie, which includes an abutment wall 16 and a pawl 18. An abutment surface 20 of the abutment wall 16 includes at least one tooth 22 facing the pawl 18; and the pawl 18 includes at least one tooth 24 facing the abutment wall 16. The parting line P.L. is staggered so that the first mold part 10 defines the pawl 18, at least one abutment surface tooth 22 on the abutment surface 20 and the second set of ratchet teeth 26 on the tongue 27 of the tie; and the second mold part 12 defines the first set of ratchet teeth 28 on the tongue 27 of the tie and at least a portion of an outside surface 30 of the abutment wall 16 that is on the opposite side of the abutment wall 16 from the portion of the abutment surface 20 that includes the at least one abutment surface tooth 22.

Molten plastic material is injected into the mold cavity and solidified therein to form the tie.

Figure 2:
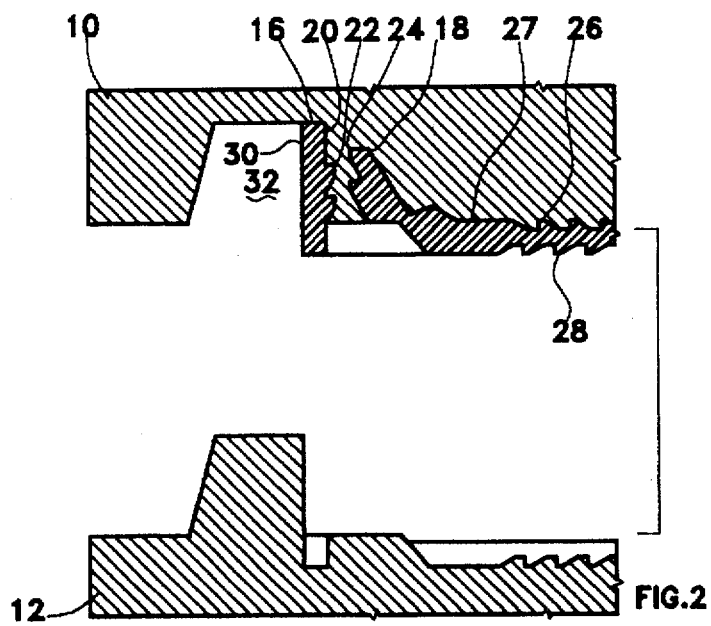
FIG. 2 is sectional view illustrating separation of the mold parts shown in FIG. 1 to enable removal of the tie.

While the first mold part 10 is separated from the second mold 12, as shown in FIG. 2, the abutment wall 16 is retained in the first mold part 10 and the outside surface 30 on the opposite side of the abutment wall 16 from the portion of the abutment surface 20 that includes the at least one abutment surface tooth 22 is separated from the second mold part 12 to thereby enable the abutment wall 16 to flex in a direction away from the pawl 18 into a space 32 vacated by separation of the second mold part 12 from the opposite side 30 of the abutment wall 16 so that the tie can be removed from the first mold part 10 without significantly damaging the at least one tooth 22 on the abutment surface 20.

Figure 3:
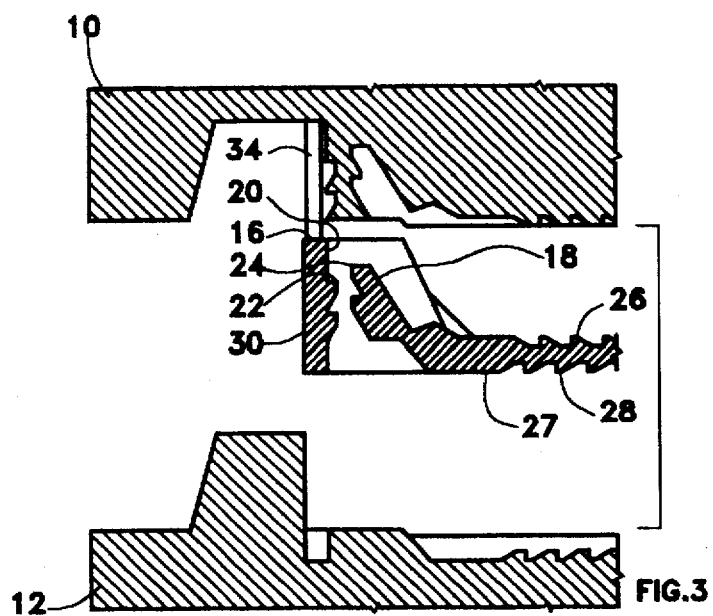
FIG. 3 is a sectional view illustrating ejection of the tie from the first mold part subsequent to separation of the mold parts as shown in FIG. 2.

The tie is ejected from the second mold part 12 by protraction of ejector pins 34, as shown in FIG. 3. As the tie is being ejected from the first mold part 10, the abutment wall 16 flexes in a direction away from the pawl 18 into the space 32 vacated by separation of the first mold part 10 from the second mold part 12, whereby the tie is removed from the mold without significantly damaging the at least one abutment surface tooth 22.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

We claim:

1. A method of injection molding a tie that includes an elongated tongue with two ends and two broad sides, a locking head at one end of the tongue, a first set of ratchet teeth extending along one broad side of the tongue and a second set of ratchet teeth extending along the other broad side of the tongue, wherein the locking head has sides defining an opening for receiving the tongue, the sides include a movable pawl that is hinged at one side of said opening and an abutment wall that is across the opening from the pawl, and the pawl has at least one pawl tooth disposed for engaging the set of first ratchet teeth when the tongue has been inserted through said opening with the first set of ratchet teeth facing the pawl, wherein the pawl, when the at least one pawl tooth is so engaged, is movable toward an abutment surface of the abutment wall in response to pressure applied to the tongue in a direction opposite to the direction of said insertion in order to force the second set of ratchet teeth against the abutment surface; and wherein the abutment surface across from the pawl includes at least one tooth for locking engagement with the second set of ratchet teeth when the tongue has been inserted through the opening with the second set of ratchet teeth facing the abutment surface and the side of the tongue including the second set of ratchet teeth is forced against the abutment surface by movement of the pawl; the method comprising the steps of (a) providing a mold that includes first and second mold parts joined at a parting line for defining a cavity between the mold parts in the general shape of the tie;

(b) injecting molten plastic material into the mold cavity;

(c) solidifying the plastic material in the mold cavity to form the tie; and (d) separating the mold parts to enable removal of the tie from the mold; and (e) removing the tie from the mold;

wherein step (a) comprises providing a said mold in which the parting line is staggered so that a first segment of the parting line at one elevation is adjacent one end of the portion of the mold cavity that shapes the portion of the abutment surface that includes the at least one abutment surface tooth and a second segment of the parting line at a different elevation is adjacent the opposite end of the portion of the mold cavity that shapes the portion of the abutment surface that includes the at least one abutment surface tooth, so that the first mold part defines the portion of the abutment surface that includes the at least one abutment surface tooth and so that the second mold part defines at least a portion of a surface of the abutment wall that is on the opposite side of the abutment wall from the portion of the abutment surface that includes the at least one abutment surface tooth; and wherein step (d) comprises the step of (f) separating the first mold part from the second mold part while retaining the abutment wall in the first mold part to separate the second mold part from the opposite side of the abutment wall to thereby enable the abutment wall to flex in a direction away from the pawl into space vacated by separation of the second mold part from the opposite side of the abutment wall so that the tie can be removed from the mold pursuant to step (e) without significantly damaging the at least one abutment surface tooth.

2. A method according to claim 1, wherein step (a) comprises providing a said mold in which the first mold part defines the second set of ratchet teeth and in which the second mold part defines the first set of ratchet teeth.

* * * * *